May 25, 1937. H. BAADE 2,081,571
COUPLING
Filed June 8, 1935
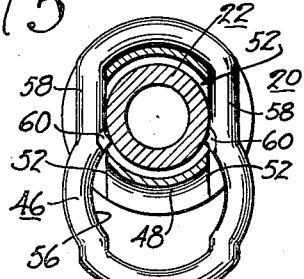
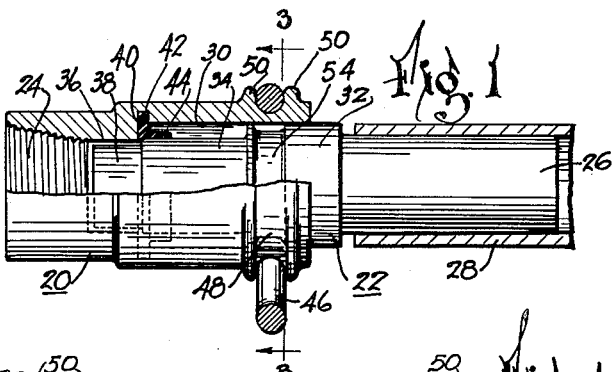
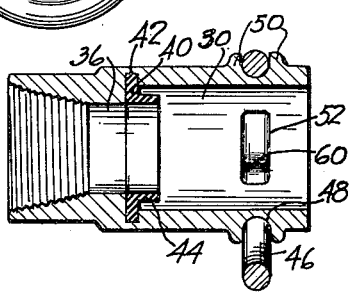
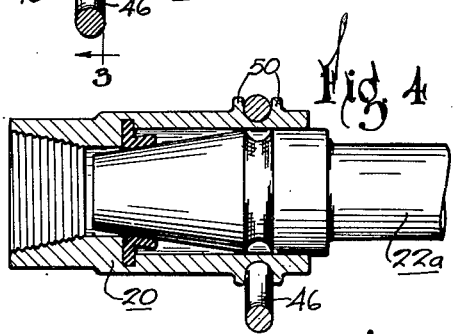
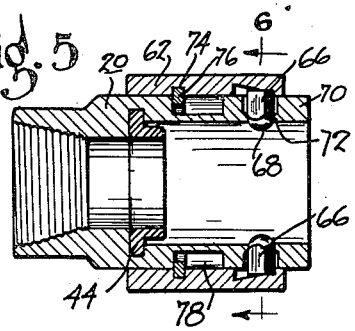
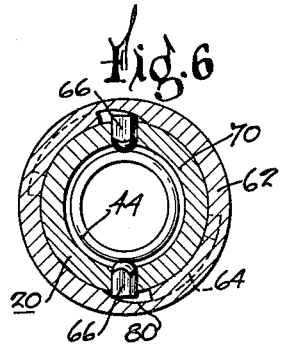
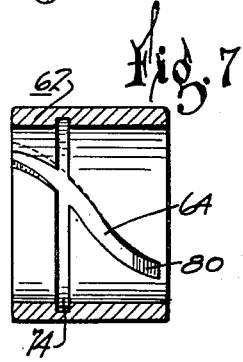
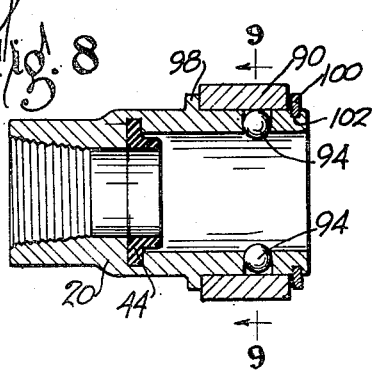
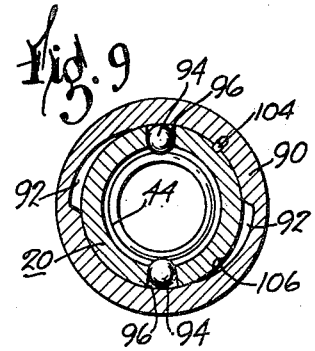
INVENTOR.
Henry Baade
BY
A. E. Wilson
ATTORNEY.

Patented May 25, 1937

2,081,571

UNITED STATES PATENT OFFICE 2,081,571

COUPLING

Henry Baade, South Bend, Ind., assignor to Bendix Products Corporation, South Bend, Ind., a corporation of Indiana Application June 8, 1935, Serial No. 25,532

9 Claims. (Cl. 285—168)

This invention relates to couplings and more particularly to a coupling member designed for the transmission of fluid pressure.

An example of the type of use wherein this coupling is especially desirable is in the transmission of differential fluid pressures for the actuation of differential pressure operated control members of vehicles. In such vehicles tractor and trailer units are frequently employed, and it is desirable to disconnect the trailer unit from the tractor unit at certain times. It is therefore desirable to provide a coupling device wherein the hose connection interconnecting the two units may be quickly and easily disconnected.

An object of this invention is therefore to provide a coupling wherein the parts of the coupling may be quickly connected or disconnected with the least possible effort on the part of the operator.

Another object of the invention is to provide an improved female member having straight internal side walls, which may be employed with male members having either straight or tapered side walls.

A further object of the invention is to provide a locking link whereby the members of the coupling may be quickly and easily connected or disconnected with greater facility.

A still further object of the invention is to provide a female coupling member having a novel packing ring, whereby the connection may be securely sealed against the escape of fluid.

Another object of the invention is to provide a female coupling member which may be manufactured at materially less cost than similar female devices of the prior art.

Yet a further object of the invention is to provide novel locking means whereby the coupling may be locked in either the connected or the disconnected positions.

Other objects and advantages of the invention will be apparent from the following detailed description, taken in connection with the accompanying drawing, submitted for purposes of illustration only, and not intended to define the scope of the invention, reference being had for that purpose to the subjoined claims.

In the drawing, wherein similar reference characters refer to similar parts throughout the several views:

Figure 1 is a view partly in section, showing the improved coupling members in the connected position;

Figure 2 is a sectional view of the improved female member;

Figure 3 is a view taken on the lines 3—3 of Figure 1;

Figure 4 is an assembled view of the improved female member connected with a male member having tapered side walls;

Figure 5 is a sectional view of a modified form of locking means;

Figure 6 is a view taken on the lines 6—6 of Figure 5;

Figure 7 is a view taken on the lines 7—7 of Figure 6;

Figure 8 is a detail view showing a further modified locking device;

Figure 9 is a view taken on the line 9—9 of Figure 8; and

Figure 10 is a view taken on the line 10—10 of Figure 9.

Referring more particularly to Figure 1, there is shown a coupling having a female member 20, and a male member 22. The female member is provided with a threaded section 24 for fitting the member 20 to a threaded connector. The member 22 is provided with a section 26 of reduced diameter, designed to receive a hose connection 28.

The member 20 is provided with a section of constant internal diameter 30 designed to receive the stepped surfaces 32 and 34 of the member 22. The member 20 is provided with a section of decreased internal diameter 36 designed to receive a section of reduced outer diameter 38 of the member 22. A packing ring 40, formed of rubber or other suitable resilient material, is carried in an annular ring 42 adjacent the section of reduced internal diameter of the section 20. The packing ring 40 is provided with an annular cup section 44, designed to engage the stepped surface 34 when the members 20 and 22 are in the assembled position.

The members 20 and 22 are designed to be fixed together by means of a locking ring 46, slidable in a groove 48, formed between two flanges 50, formed on the outer periphery of the member 20. The locking link 46 is slidable transversely in milled slots 52, extending through the side walls of the member 20. The member 22 is provided with a groove 54 formed in the stepped surface 32. The locking ring 46 is provided with an enlarged circular section having an internal diameter 56 of sufficient size to receive the stepped surface 32 of the member 22. The locking link 46 is also provided with straight side members 58, the distance therebetween being less than the diameter of the stepped surface 32, but greater than the smallest diameter of the groove 54. The locking link 46 is provided with clamping sections 60, carried between the side members 58 and the internal diameter 56.

To assemble the connection, the locking link 46 is moved transversely across the face of member 20, to one extreme position, whereupon the internal diameter 56 of the link 46 is in such a position to permit the stepped surface 32 of member 22 to be projected into the member 20. After insertion of the member 22, the locking link 46 is moved transversely across the face of the member 22 to the other extreme position, whereupon the side members 58 of the link 46 fit into the groove 54 of the member 22, and the clamping sections 60 lock the link 46 in position to prevent relative longitudinal movement between the two members.

As the member 22 is projected into the member 20, the stepped surface 34 engages the cup section 44 of the packing ring 40 to securely seal the members of the coupling. If subatmospheric pressure is transmitted through the coupling, the cup section 44 will be forced by atmospheric pressure into contact with the stepped surface 34 as shown, to securely seal the coupling. If, however, the superatmospheric pressure is to be transmitted through the coupling, the cup section 44 may be turned in the reverse direction to engage the section of reduced internal diameter of the member 20 so as to be extended into contact therewith by the pressure exerted within the coupling.

Figure 4 shows the improved female member 20 assembled with a male member 22a having tapered side walls. This view shows how effectively the packing ring 40, carried by the member 20, seals the coupling when used in this manner.

Figure 5 shows a coupling member having a different type of locking means, wherein a locking sleeve 62 is employed. The locking sleeve 62 is provided with a plurality of spiral grooves 64 having detents 66 slidable therein. The detents 66 are formed with rounded end portions 68 and square side walls to facilitate movement through the spiral groove 64. The detents 66 are set in apertures projecting through the side walls 70 of the member 20. The aperture is formed with overhanging projections 72 of a size such that the rounded section 68 of the detent can project therethrough, but the square section will not pass through the aperture. The detents 66 are thus prevented from escaping from the apertures 70. The locking sleeve 62 is formed with a concentric groove 74 to receive a snap ring 76, slidable in an annular groove 78, formed in the outer walls of the member 20. The spiral groove 64 is of constant depth over the greater portion of its length, but is provided with a section of decreasing depth 80, to engage the pins 66 and move them toward the axis of the member 20 upon rotation of the locking sleeve 62.

In the operation of this device the member 22 is projected into the member 20. The locking sleeve 62 is then rotated to move the detents 66 through the apertures 70. The rounded end sections 68 of the detents 66 will then engage within groove 54, formed in the member 22, to securely clamp the members 20 and 22 together. To uncouple the members, the locking sleeve 62 is rotated in the reverse direction, whereupon the detents 66 are permitted to withdraw into the spiral grooves 64 upon the exertion of pressure upon the member 22.

In the embodiment shown in Figure 8, the locking sleeve 90 is rotatable with respect to the member 20. The locking sleeve 90 is provided with circumferentially tapered sections 92 adapted to engage the ball members 94 to move them through the apertures 96 to engage within the groove 54, carried by the member 22, to securely clamp the members 20 and 22 together. The locking sleeve 90 is prevented from moving axially by a flange 98, formed on the member 20, and a snap ring 100 carried in an annular groove 102. Snap links 104, carried by the locking sleeve 90, engage grooves 106, formed in the section 20, to lock the members 20 and 90 together. It is therefore impossible for the connection to slip or become disconnected unless sufficient force is exerted upon the locking sleeve 90 to force the snap links 104 out of the slots 106.

To unlock this coupling, the locking sleeve 90 is rotated in the clockwise direction as viewed in Figure 9 to such a position that the depressed section of the tapered sections 92 overlies the aperture 96. The ball members 94 may then be moved into the tapered sections 92 to withdraw them from the groove 54 of the member 22.

To lock the members of the coupling together, the sleeve 90 is rotated in the counterclockwise direction as viewed in Figure 9. The ball members 94 will then be urged through the apertures 96 by the tapered sections 92, to engage within the groove 54 of the member 22, to securely clamp the members 20 and 22 together. It will be understood, of course, that the apertures 96 are provided with contracted sections 108 to prevent the ball members 94 from passing completely through the apertures 96.

While the invention has been described with reference to certain preferred embodiments, it is not intended to limit the scope of the invention to the features disclosed, nor otherwise, than by the terms of the subjoined claims.

I claim:

1. As an article of manufacture, a female member for a hose coupling having means to fix the member to a hose, a plurality of interior stepped surfaces, an annular groove formed between two adjacent stepped surfaces of the member, resilient packing material carried in the groove, an annular groove formed in the outer wall of the member, milled slots on opposite sides of the groove extending through the side walls of the member, and a locking link slidable in the groove and provided with parallel side walls designed to project through the milled slots to form a section of reduced internal diameter of said member when the locking link is in one extreme position, the locking link also having expanded circular side walls designed to not reduce the internal diameter of said member when the locking link is moved to another extreme position, and resilient means carried by the locking link to resiliently lock the link in either extreme position.

2. In a hose coupling, a female member having a plurality of interior stepped surfaces, an annular groove formed within said member, resilient packing material carried in the groove, an annular groove formed in the outer wall of the member, milled slots on opposite sides of the groove extending through the side walls of the member, a male member having a plurality of exterior stepped surfaces, an annular groove formed in one of the stepped surfaces designed to underlie said milled slots when the members are assembled, means to lock said members together and to unlock them, said means including a locking link slidable in the groove formed in the outer wall of the female member and provided with parallel side walls designed to project through said milled slots to engage the annular groove formed in one of the stepped surfaces of the male member when the locking link is in one extreme position, the locking link also having expanded circular side walls designed to release the male member when the locking link is moved to another extreme position, and resilient means carried by the locking link to resiliently lock the link in either extreme position.

3. In a vehicle having tractor and trailer units, a source of differential fluid pressure, differential pressure actuated control means for both the tractor and trailer units, a hose connecting the tractor and trailer units, a hose coupling including a female member having a plurality of interior stepped surfaces, an annular groove formed within said member, resilient packing material carried in the groove, an annular groove formed in the outer wall of the member, milled slots on opposite sides of the groove extending through the side walls of the member, a male member having a plurality of exterior stepped surfaces, an annular groove formed in one of the stepped surfaces designed to underlie said milled slots when the members are assembled, means to lock said members together and to unlock them, said means including a locking link slidable in the groove formed in the outer wall of the female member and provided with parallel side walls designed to project through said milled slots to engage the annular groove formed in one of the stepped surfaces of the male member when the locking link is in one extreme position, the locking link also having expanded circular side walls designed to release the male member when the locking link is moved to another extreme position, and resilient means carried by the locking link to resiliently lock the link in either extreme position.

4. A female member for a hose coupling having a plurality of interior stepped surfaces, an annular groove formed within said member, resilient packing material carried in the groove, an annular groove on the outer surface of the member, a locking sleeve rotatably mounted on said member, stop means including a snap ring positioned in an annular groove in the locking ring and slidable longitudinally in said annular groove on the outer surface of the member to define the limits of longitudinal movement of the locking sleeve, spiral grooves formed in the inner surface of the locking ring, a portion of the spiral grooves being of decreasing depth, and detents projecting through apertures in the side walls of said member and positioned in the spiral grooves.

5. As an article of manufacture, a female member for a hose coupling having a plurality of interior stepped surfaces, an annular groove formed within said member, resilient packing material carried in the groove, an annular groove on the outer surface of the member, a locking sleeve rotatably mounted on said member, stop means including a snap ring positioned in an annular groove in the locking ring and slidable longitudinally in said annular groove on the outer surface of the member to define the limits of longitudinal movement of the locking sleeve, spiral grooves formed in the inner surface of the locking ring, a portion of the spiral grooves being of decreasing depth, and detents having rounded heads and square body sections projecting through restricted apertures in the side walls of said member and positioned in the spiral grooves whereupon the detents will be projected into or permitted to be withdrawn from the restricted apertures upon rotation of the locking sleeve.

6. A female member for a hose coupling having a plurality of interior-stepped surfaces, an annular groove formed within said member, resilient packing material carried in the groove, a locking sleeve rotatably mounted on said member, stop means including a snap ring positioned in an annular groove in the outer surface of the member to define the limits of longitudinal movement of the locking sleeve, annular grooves of decreasing depth formed in the inner surface of the locking ring, and ball members projecting through restricted apertures in the side walls of said member and positioned in the annular grooves.

7. A female member for a hose coupling having a plurality of interior stepped surfaces, an annular groove formed within said member, resilient packing material carried in the groove, a locking sleeve rotatably mounted on said member, stop means including a snap ring positioned in an annular groove in the outer surface of the member to define the limits of longitudinal movement of the locking sleeve, annular grooves of decreasing depth formed in the inner surface of the locking ring, and ball members projecting through restricted apertures in the side walls of said member and positioned in the annular grooves whereupon the balls will be projected into or permitted to be withdrawn from the restricted apertures upon rotation of the locking sleeve, and locking means including a resilient snap member carried by the locking sleeve and cooperating with longitudinal grooves in said member to hold the locking sleeve in either the locked or the unlocked position.

8. For a hose coupling composed of a male portion and a female portion, a female portion comprising a tube formed with a pair of bores of different diameters and a step between the bores, and an annular sealing ring of L-shaped cross section having an angle and a portion parallel to one of the bores and positioned adjacent to the step and secured within said member so that the angle of the L-shaped sealing ring shall be opposite to the direction of insertion of the male portion and so that the parallel portion is arranged to contact the male member.

9. For a hose coupling composed of a male portion and a female portion, a female portion comprising a tube formed with a pair of bores of different diameters and a step between the bores, and an annular sealing ring of L-shaped cross section having a flange extending radially of the coupling and positioned adjacent to the step and secured within said member with the flange backed by the step.

HENRY BAADE.